TELEPHONE RINGING SIGNAL DETECTION MEANS

Filed Aug. 31, 1966

INVENTOR.
KALJU MERI
BY
Friedman & Goodman
ATTORNEYS

United States Patent Office
3,469,036
Patented Sept. 23, 1969

3,469,036

TELEPHONE RINGING SIGNAL DETECTION MEANS

Kalju Meri, Maspeth, N.Y., assignor to Robosonics, Inc., Bronx, N.Y., a corporation of Delaware Filed Aug. 31, 1966, Ser. No. 576,327
Int. Cl. H04m *1/54*
U.S. Cl. 179—84 7 Claims

ABSTRACT OF THE DISCLOSURE

For a telephone answering service, ringing detection means comprising a neon tube detector which conducts ringing signals, neon tube signal by-pass means connected so as to by-pass signals other than ringing signals, and photocell means responsive to ringing signal detector which activates information transmitting and receiving means.

The present invention relates to telephone answering circuits and more particularly to a telephone ringing signal detection means adaptable to telephone answering circuits.

Telephone answering circuits adaptable to telephone lines must be designed to meet technical specifications dictated by telephone companies which own the lines to which the circuits are adapted. In the past, circuits have been developed which meet the requirements at great cost, with a high degree of unnecessary technical sophistication which generally appreciates maintenance costs, or with little thought to reliability, rugged construction and overall simplicity. Telephone companies demand high impedance circuits be employed to avoid loading telephone ringing circuits and voice circuits. Circuits which meet the requirements are typically unresponsive to low level ringing signals and when made sufficiently sensitive thereto are rendered responsive to signals to which they should not respond. Accordingly, it is desirable that a circuit which meets the telephone company technical specifications be sensitive to ringing signals; unresponsive to other than ringing signals; highly reliable; provided at low cost; simply and ruggedly constructed; and be relatively inexpensively maintained. Further, it is particularly desirable that the ringing signal detection circuits be unresponsive to revert dialing signals impressed on telephone company lines, when local subscribers having answering service circuits associated with their hand set dial the central office for connection ao a remote subscriber, so that the detector is not falsely triggered.

An object of the present invention is to provide a high impedance ringing signal detection circuit to initiate the coupling of telephone answering circuits into telephone company lines.

Another object is to provide a telephone ringing signal detection circuit.

Another object is to provide a ruggedly constructed, low cost circuit which detects ringing signals and will not be falsely triggered by revert dialing pulses.

A further object is to provide means to decouple the telephone line from the means which respond to ringing signals.

Still another object is to provide a simply constructed inexpensively maintained circuit which meets the foregoing objectives.

Other objects and many of the attendant advantages of this invention will be readily appreciated as the same becomes better understood by references to the following detailed description when considered in connection with the accompanying drawings, wherein.

Figure 1:
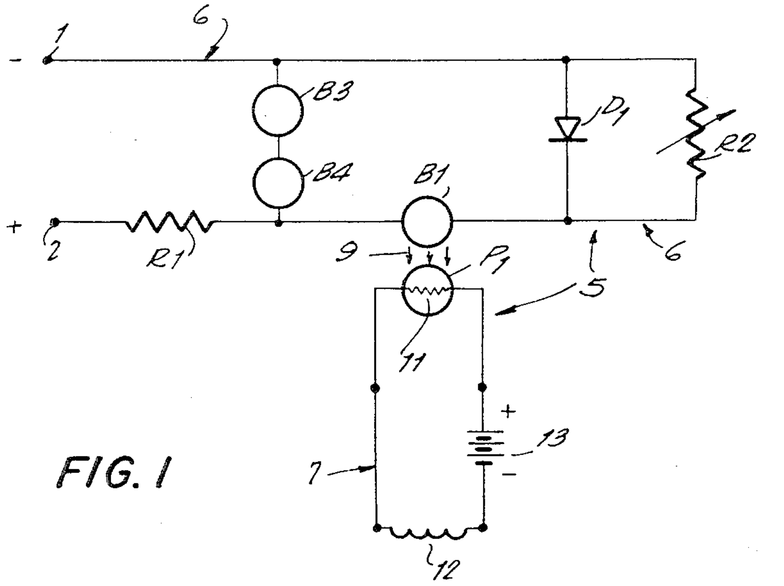
FIGURE 1 is a circuit diagram of an embodiment of the present invention.

In order that the invention be disclosed in a clear and concise manner, the disclosure has been simplified to some extent by omitting the talking portions from the illustration of the preferred embodiment and disclosing only the ringing signal detection means portion of the circuit at the subscriber's station. Although the invention is applicable to multistation signaling systems generally and is not limited to telephone use alone, it is understood that those skilled in the telephone art may readily add speech transmitting and receiving apparatus and ringing signal apparatus to the circuits illustrated in the drawing, in a manner well known in the art, and that any one of many well known types of means may be employed for this purpose.

Referring now to the drawings, there is shown in FIGURE 1 an embodiment of the telephone ringing signal detection means circuit 5 comprising a signal sensing means circuit 6 and a responsive means circuit 7. The signal sensing circuit 6 is connected to the incoming telephone lines by means of terminals 1 and 2. A low impedance conduction path for undesirable signals comprising a lamp B3 connected in series with another lamp B4 is connected to terminal 1 on one side and to terminal 2 by means of a resistor R1 on the other side. A low impedance condction path for ringing signals comprising a lamp B1 connected in series with a parallel combination of a diode D1 and a variable resistor R2 is connected to terminal 1 on one side and to the junction between the lamp B4 and the resistor R1 on the other side, thereby connecting the lamp B1 to terminal 2 by means of the resistor R1. The resistor R1 in series with terminal 2 may be advantageously a 27,000 ohm resistor or resistor of any other value as may be necessary to meet the technical specifications dictated by telephone companies as to maximum loading conditions allowed on their lines.

Figure 4:
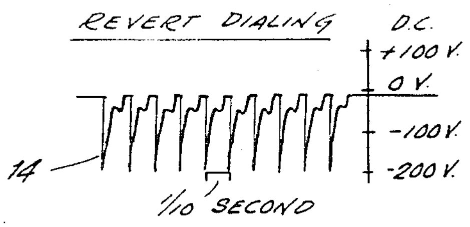
FIGURE 4 is an illustration of a typical undesirable signal.

FIGURE 4 shows a typical revert dialing waveform 14. Revert dialing waveforms are impressed on incoming telephone lines when the local subscriber dials the central office for connection to a remote subscriber.

The glass bulb lamps B1, B3 and B4 are ionizable neon gas filled glow lamps having a very low impedance conducting state and a substantially infinite impedance non-conducting state. Each of the lamps has a pair of terminals for circuit connection. The lamps ionize and conduct in response to the application of a voltage across said terminals that is equal to or greater than a built-in breakdown voltage. Ion current flow lamps emit light which may be used to change the static circuit conditions of a nearby circuit which employs a light sensitive element therein. In the preferred embodiment a light sensitive element P1 is so employed in the responsive means circuit 7 as will hereinafter be more fully disclosed. In the preferred embodiment, lamps having a breakdown voltage of approximately 80 volts are advantageously employed in the signal sensing means circuit 6 to distinguish between ringing signals 15 and 16 and revert dialing signals 14 or other undesirable waveforms, and act as switches to complete the low impedance conduction paths hereinbefore described.

It is understood, of course, that lamps having breakdown voltages of other than 80 volts may be advantageously employed in other embodiments of the invention to provide switching means which operate at voltage levels other than the voltage levels hereinafter discussed.

Figure 2:
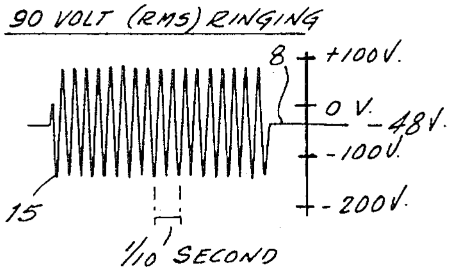
FIGURE 2 is an illustration of a typical normal ringing signal waveform.
Figure 3:
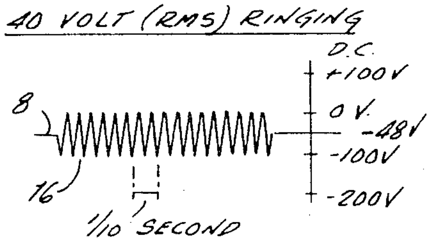
FIGURE 3 is an illustration of a typical low level ringing signal waveform.

Referring now to the signal sensing means portion 6 of the detection means circuit 5 shown in FIGURE 1, it is seen that under static circuit conditions terminal 2 is biased by a power supply in the central office which is usually a D.C. source of minus 48 volts. FIGURES 2 and 3 reflect such biasing in that the ringing signal waveforms therein illustrated fluctuate with respect to a datum level 8 of minus 48 volts. The diode D1 is poled to conduct when terminal 1 is positive with respect to terminal 2. Under static circuit conditions the voltage drop across the diode D1 is zero since the diode does not conduct until the lamp B1 ionizes thereby allowing completion of the signal transmission path through said lamp. In operation this occurs when a signal applied to terminal 1 reduces the voltage at said terminal to minus 80 volts, or increases the voltage level at said terminal to plus 80 volts thereby changing the voltage of terminal 1 relative to terminal 2 to a level equal to the 80 volt breakdown voltage of the lamp B1. The lamps B3 and B4 are series connected so that their substantially 80 volt breakdown voltages add thereby establishing the breakdown voltage of the series combination at a level of substantially 160 volts. In operation this occurs when a signal applied to terminal 1 reduces the voltage at said terminal to minus 160 volts, or increases the voltage level at said terminal to plus 160 volts, thereby changing the voltage of terminal 1 relative to terminal 2 to a level equal to the 160 volt breakdown voltage of the series combination of lamps B3 and B4. The resistor R1 connected to the junction between the lamps B1 and B4 in no ways affects static circuit condition, since the voltage level on either side of said resistor is substantially the same as the voltage at terminal 2 until the lamps conduct and a voltage drop appears across said resistor. Similarly, the variable resistor R2 and diode D1 in shunt therewith in no way affect static circuit conditions since the voltage level on either side of said shunt combination is substantially the same as the voltage at terminal 1 until the lamp B1 conducts and a voltage drop appears across said combination.

Referring now to FIGURE 2, it is seen that the normal ringing signal 15 having positive and negative voltage excursions relative to the voltage level at terminal 1 will cause the lamp B1 to breakdown since the sinusoidal waveform positively peaks at more than plus 80 volts and less than minus 80 volts. However, the series connected lamps B3 and B4 do not breakdown on application of said normal signal, since the positive portions thereof are less than plus 160 volts and the negative portions thereof are greater than minus 160 volts.

Referring now to FIGURE 3, it is seen that the low level ringing signal 16 having positive and negative voltage excursions relative to the voltage level at terminal 1 will cause the lamp B1 to breakdown since the sinusoidal waveform negatively peaks at less than minus 80 volts. However, the series connected lamps B3 and B4 do not breakdown on application of said low level signal since the positive portions thereof are less than plus 160 volts and the negative portions thereof are greater than minus 160 volts.

Referring now to FIGURE 4, it is seen that in accordance with the above, revert dialing pulses will cause the lamp B1 to breakdown since the pulses comprising the waveform negatively peak at less than minus 80 volts. However, in practice, the lamps B3 and B4 breakdown immediately thereafter since the pulses peak at less than minus 160 volts, thereby prematurely extinguishing ionization of the lamp B1. As a result, the lamp B1 flickers without causing faulty circuit operation.

In operation information transmitted over multistation information transmission lines comprises a variety of signals including ringing signals and signals other than ringing signals such as the revert dialing pulses 14 shown in FIGURE 4. The lamp B1 comprises a switch adaptable as a detector means across terminals 1 and 2 which detects the presence of ringing signals on incoming lines and responds thereto by providing a low impedance conducting path from terminal 1, through the combination of the resistor R2 and diode D1 in parallel with respect to each other, through the lamp B1 and the resistor R1 to terminal 2. The lamps B3 and B4 comprise a switch adaptable as a rejection means across terminals 1 and 2 which detects the presence of signals other than ringing signals on incoming lines and responds thereto by providing a low impedance conducting path from terminal 1, through the lamps B3 and B4 and the resistor R1 to terminal 2, thereby preventing said signals other than ringing signals 14 from operating said lamp B1. When the lamp B1 conducts it emits light 9 which impinges on the light sensitive means P1 in the responsive means circuit 7 which closes a conduction path to activate the means responsive to changes in current 12 as will hereinafter be described.

The variable resistor R2 and diode D1 combination may be omitted from the circuit without affecting functional operation of the circuit.

However, the parallel combination of the diode D1 and variable resistor R2 is provided in the best mode of the inventive device to insure that the light sensitive means P1 fails to respond to revert dialing signals although said means reliably responds to ringing signals.

As seen in FIGURES 2, 3 and 4, revert dialing signals are primarily comprised of a series of negative voltage excursions while ringing signals fluctuate both positively and negatively. The parallel combination of the resistor R2 and diode D1 provides a substantially short circuit path for positive voltage fluctuations and a damping path for negative voltage fluctuations. The resistor R2 may be varied to provide sufficient damping of negative fluctuations to substantially eliminate the flicker of the lamp B1 in the presence of revert dialing pulses. Although negative voltage fluctuations in ringing signals are also damped, the positive voltage fluctuations thereof provide for reliable circuit operation. Damping negative voltage excursions correspondingly reduces the light emitted by the lamp B1, thereby insuring that the light sensitive means P1 fails to respond to revert dialing signals.

Referring now to FIGURE 1, it is seen that the light sensitive means P1 in the responsive means circuit 7 comprises a photoconductive photocell having a resistance material 11 therein. The resistance of the material 11 to the flow of current is materially altered when it is illuminated by light 9. The photocell P1 acts as a switch in response to light radiation in that when it is not illuminated it is substantially an opened circuit element and when illuminated is substantially a closed circuit element. A power supply 13 comprising a D.C. source has one terminal thereof connected to one side of the photocell and the other terminal thereof connected by means of a winding 12 to the other side of the photocell. The winding 12 is generally representative of means responsive to changes in current and may advantageously be a relay coil, a transformer winding or the like.

In operation, illumination of the photocell P1 closes the conduction path from one side of the battery 13 through the series connected photocell P1 and winding 12 to the other side of the battery. The means responsive to changes in current 12 may be associated with and activate any well known transmitting and receiving means associated with multiparty transmission lines. The responsive means circuit 7 is operationally associated with the signal sensing means circuit 6, but at the same time physically disassociated therefrom thereby decoupling the telephone line from the responsive means circuit 7 to avoid loading down the telephone lines.

It should be understood, of course, that the impedance the inventive circuit presents to the terminals 1 and 2 when the circuit is in its non-conducting state is substantially the same as the impedance of the lamps, said impedance being substantially infinite. The lowest impedance presented to the terminals 1 and 2 when the circuit is in the conducting state is substantially the value of resistor R1. The value of the resistor R1 is advantageously chosen to be a low value, as compared to the impedance of the circuit when it is not conducting, but at the same time the resistor is advantageously chosen to be as high an impedance as is needed to meet the loading demands dictated by the telephone company.

Further, the foregoing disclosure relates to only a preferred embodiment of the invention and that it is intended to cover all changes and modifications of the example of the invention herein chosen for the purpose of the disclosure, which do not constitute departures from the spirit and scope of the invention.

I claim:

1. In a multistation signaling system provided with information transmission lines and having signals comprising ringing signals and signals other than ringing signals on said lines, a ringing signal detection circuit connected to said lines comprising, in combination, a detector which detects said ringing signals, said detector providing a low impedance path for the ringing signals, said detector having the characteristic of emitting light when it detects the ringing signals, signal by-pass means connected in parallel with said detector which by-pass said signals other than ringing signals, means responsive to the ringing signal detector, information transmitting and receiving means associated with said lines and activated by said responsive means, said responsive means responding to said light by activating said information transmitting and receiving means.

2. In a ringing signal detection circuit as set forth in claim 1, said detector being a neon gas filled glow lamp, said glow lamp having a conducting state and a non-conducting state, said glow lamp being switched to said conducting state by application of said ringing signals.

3. In a ringing signal detection circuit as set forth in claim 1, said by-pass means comprising a neon gas filled glow lamp, said glow lamp having a conducting and a non-conducting state, and said glow lamp being switched to said conducting state by application of said signals other than ringing signals thereby preventing said signals other than ringing signals from operating said detector.

4. A ringing signal detector circuit according to claim 1, said detector comprising a switch means across said lines which conducts on detection of said ringing signals on said lines and does not conduct when said signals other than ringing signals are on said lines, said detector responding to said ringing signals by providing a low impedance conduction path for said ringing signals comprising a resistor in series with said detector.

5. A ringing signal detector circuit according to claim 4, said by-pass means in shunt with said detector comprising a switch means across said lines which conducts on detection of said signal other than ringing signals on said lines and does not conduct when said ringing signals are on said lines, said by-pass means responding to said signals other than ringing signals by providing a low impedance conduction path for said signals other than ringing signals comprising a resistor in series with said by-pass means.

6. A ringing signal detector circuit according to claim 5, said detector responding to said ringing signals by providing a conduction path for said ringing signals comprising a variable resistor connected on one side to said detector and on the other side to said by-pass means.

7. A ringing signal detector circuit according to claim 6, including a diode in parallel with said variable resistor.

References Cited

UNITED STATES PATENTS

| | | | |
|---|---|---|---|
| 3,406,262 | 10/1968 | Grandstaff | 179—84 |
| 3,322,902 | 5/1967 | Carney | 179—84 |

KATHLEEN H. CLAFFY, Primary Examiner

W. A. HELVESTINE, Assistant Examiner

U.S. Cl. X.R.

179—81, 86